(12) United States Patent
Chowdhury et al.

(10) Patent No.: US 10,819,261 B1
(45) Date of Patent: Oct. 27, 2020

(54) SECURITY IMPROVEMENTS FOR ELECTRIC POWER GENERATOR PROTECTION

(71) Applicant: Schweitzer Engineering Laboratories, Inc., Pullman, WA (US)

(72) Inventors: Ritwik Chowdhury, Charlotte, NC (US); Dale S. Finney, Little Bras D'or (CA); Normann Fischer, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/732,838

(22) Filed: Jan. 2, 2020

Related U.S. Application Data

(60) Provisional application No. 62/926,034, filed on Oct. 25, 2019.

(51) Int. Cl.

| | |
|---|---|
| *H02P 9/00* | (2006.01) |
| *H03K 17/082* | (2006.01) |
| *H02M 7/5387* | (2007.01) |
| *H02H 3/08* | (2006.01) |
| *G01R 31/02* | (2006.01) |
| *G01R 29/16* | (2006.01) |

(52) U.S. Cl.
CPC .................................. *H02P 9/006* (2013.01)

(58) Field of Classification Search
CPC .... H02P 9/006; H03K 17/082; H02M 7/5387; H02H 3/00; H02H 3/08; H02H 3/27; G01R 29/16; G01R 31/02

USPC .................... 322/11; 307/130, 131; 324/500; 361/94, 95; 700/239; 702/58; 706/45
See application file for complete search history.

(56) References Cited

U.S. PATENT DOCUMENTS

| | | |
|---|---|---|
| 2,881,319 A | 4/1959 | Sills |
| 3,727,123 A | 4/1973 | Smith |

(Continued)

FOREIGN PATENT DOCUMENTS

| | | |
|---|---|---|
| CN | 203324449 U | 12/2013 |
| JP | 53107640 | 9/1978 |

(Continued)

OTHER PUBLICATIONS

Rik Pintelon, Johan Schoukens, System Identification: A Frequency Domain Approach, Section 4.3 (pp. 119-131), Jan. 1, 2001.

(Continued)

*Primary Examiner* — Pedro J Cuevas
(74) *Attorney, Agent, or Firm* — Richard M. Edge

(57) ABSTRACT

Electric power generator protection is secured by detecting wiring errors to an intelligent electronic device using terminal third voltages at the terminal (VT3) and third harmonic voltages at the neutral (VN3). When an angle between VT3 and VN3 is outside of an acceptable range, a wiring defect is detected, and certain protective operations are blocked. An alarm may be generated, facilitating personnel to identify and rectify the wiring defect. Wiring defects may further be detected when a torque calculated using VT3 and VN3 exceeds a predetermined error threshold. Security of protection elements is increased by detection of wiring defects that may have resulted in misoperation of the protection elements.

20 Claims, 7 Drawing Sheets

(56) References Cited

U.S. PATENT DOCUMENTS

| | | | | |
|---|---|---|---|---|
| 3,973,171 | A | 8/1976 | Howell | |
| 4,000,464 | A | 12/1976 | Mussel | |
| 4,001,646 | A | 1/1977 | Howell | |
| 4,029,951 | A | 6/1977 | Berry | |
| 4,066,950 | A | 1/1978 | Rumold | |
| 4,088,935 | A | 5/1978 | D'Atre | |
| 4,148,087 | A | 4/1979 | Phadke | |
| 4,156,186 | A | 5/1979 | Wolfinger | |
| 4,159,499 | A | 6/1979 | Breskin | |
| 4,161,011 | A | 7/1979 | Wilkinson | |
| 4,206,398 | A | 6/1980 | Janning | |
| 4,245,182 | A | 1/1981 | Aotsu | |
| 4,321,643 | A | 3/1982 | Vernier | |
| 4,371,832 | A | 2/1983 | Wilson | |
| 4,511,811 | A | 4/1985 | Gupta | |
| 4,542,468 | A | 9/1985 | Taniguti | |
| 4,556,946 | A | 12/1985 | Taniguti | |
| 4,558,309 | A | 12/1985 | Antonevich | |
| 4,667,263 | A | 5/1987 | Morris | |
| 4,739,759 | A * | 4/1988 | Rexroth | A61B 18/1206 606/37 |
| 4,763,057 | A | 8/1988 | Danz | |
| 4,820,991 | A | 4/1989 | Clark | |
| 4,825,327 | A | 4/1989 | Alexander | |
| 4,851,758 | A | 7/1989 | Ostada | |
| 4,868,506 | A * | 9/1989 | DiStefano | G01R 31/2805 324/521 |
| 4,939,506 | A | 7/1990 | Gram | |
| 4,982,147 | A | 1/1991 | Lauw | |
| 5,057,962 | A | 10/1991 | Alley | |
| 5,252,915 | A | 10/1993 | Sedding | |
| 5,264,778 | A | 11/1993 | Kimmel | |
| 5,363,047 | A | 11/1994 | Dresti | |
| 5,365,396 | A | 11/1994 | Roberts | |
| 5,471,880 | A | 12/1995 | Lang | |
| 5,508,620 | A | 4/1996 | Pfiffner | |
| 5,514,963 | A | 5/1996 | Korbmacher | |
| 5,519,300 | A | 5/1996 | Leon | |
| 5,581,470 | A | 12/1996 | Pawloski | |
| 5,592,393 | A | 1/1997 | Yalla | |
| 5,633,550 | A | 5/1997 | Meehan | |
| 5,644,463 | A * | 7/1997 | El-Sharkawi | H01H 9/56 361/2 |
| 5,670,864 | A * | 9/1997 | Marx | G05F 1/70 323/210 |
| 5,675,465 | A | 10/1997 | Tanaka | |
| 5,739,693 | A | 4/1998 | Pfiffner | |
| 5,764,462 | A | 6/1998 | Tanaka | |
| 5,805,395 | A | 9/1998 | Hu | |
| 5,883,437 | A * | 3/1999 | Maruyama | G02F 1/136286 257/773 |
| 5,933,306 | A | 8/1999 | Santos | |
| 5,963,404 | A | 10/1999 | Guzman-Casillas | |
| 5,982,595 | A | 11/1999 | Pozzuoli | |
| 6,121,886 | A | 9/2000 | Anderson | |
| 6,137,187 | A | 10/2000 | Mikhail | |
| 6,144,721 | A * | 11/2000 | Stephens | H04M 1/24 324/520 |
| 6,169,489 | B1 | 1/2001 | Kliman | |
| 6,262,550 | B1 | 7/2001 | Kliman | |
| 6,285,917 | B1 * | 9/2001 | Sekiguchi | H02J 13/00001 700/239 |
| 6,294,898 | B2 | 9/2001 | Lawson | |
| 6,396,284 | B1 | 5/2002 | Tisdale | |
| 6,426,632 | B1 | 7/2002 | Clunn | |
| 6,459,269 | B1 | 10/2002 | Jones | |
| 6,489,778 | B2 * | 12/2002 | Martin | H03K 17/0822 324/133 |
| 6,492,801 | B1 | 12/2002 | Sims | |
| 6,496,757 | B1 | 12/2002 | Flueck | |
| 6,525,504 | B1 | 2/2003 | Nygren | |
| 6,714,020 | B2 | 3/2004 | Hobelsberger | |
| 6,721,671 | B2 | 4/2004 | Roberts | |
| 6,794,879 | B2 | 9/2004 | Lawson | |
| 6,794,883 | B2 | 9/2004 | Klingel | |
| 6,815,932 | B2 | 11/2004 | Wall | |
| 6,839,207 | B2 | 1/2005 | Falliot | |
| 6,924,565 | B2 | 8/2005 | Wilkins | |
| 6,924,628 | B2 | 8/2005 | Thompson | |
| 6,975,946 | B2 | 12/2005 | Al-Hamrani | |
| 6,992,490 | B2 | 1/2006 | Nomoto | |
| 7,006,935 | B2 | 2/2006 | Seki | |
| 7,057,311 | B1 * | 6/2006 | Zhou | H01H 50/546 307/131 |
| 7,253,634 | B1 | 8/2007 | Kasztenny | |
| 7,304,403 | B2 | 12/2007 | Xu | |
| 7,450,362 | B2 * | 11/2008 | Muller | H01H 47/005 361/95 |
| 7,487,057 | B2 * | 2/2009 | Heilig | G01D 3/022 702/106 |
| 7,498,818 | B2 | 3/2009 | Benmouyal | |
| 7,528,611 | B2 | 5/2009 | Kasztenny | |
| 7,532,010 | B2 | 5/2009 | Kamel | |
| 7,592,772 | B2 | 9/2009 | Nandi | |
| 7,603,243 | B2 * | 10/2009 | Schlapp | G01R 31/11 324/528 |
| 7,642,676 | B2 * | 1/2010 | Washington | H02J 9/06 307/130 |
| 7,660,776 | B1 * | 2/2010 | Kious | G06N 5/025 706/45 |
| 7,693,607 | B2 | 4/2010 | Kasztenny | |
| 7,710,693 | B2 | 5/2010 | Guzman-Casillas | |
| 7,804,303 | B2 | 9/2010 | Benmouyal | |
| 7,944,068 | B2 * | 5/2011 | Wagoner | H02J 3/38 290/44 |
| 8,289,668 | B2 * | 10/2012 | Kasztenny | H02H 3/28 361/87 |
| 8,385,038 | B2 * | 2/2013 | Saito | H01H 9/563 361/115 |
| 8,405,940 | B2 | 3/2013 | Schweitzer | |
| 8,553,379 | B2 * | 10/2013 | Kasztenny | H02H 7/045 361/36 |
| 8,624,578 | B2 * | 1/2014 | Rupert | G01R 21/133 324/76.77 |
| 8,688,283 | B2 * | 4/2014 | Ganev | H02H 3/52 700/293 |
| 8,823,307 | B2 | 9/2014 | Gajic | |
| 8,953,295 | B2 * | 2/2015 | Jankowski | H02H 3/38 361/93.9 |
| 9,128,140 | B2 * | 9/2015 | Fischer | H02H 3/165 |
| 9,496,707 | B2 | 11/2016 | Thompson | |
| 9,829,519 | B2 * | 11/2017 | Hayashi | G01R 25/00 |
| 9,869,704 | B2 * | 1/2018 | Ishihara | G01R 31/67 |
| 9,991,075 | B2 * | 6/2018 | Lenig | H01H 47/18 |
| 10,088,546 | B2 * | 10/2018 | Gao | G01R 35/005 |
| 10,250,161 | B1 * | 4/2019 | Leggate | H02P 27/08 |
| 10,333,291 | B2 | 6/2019 | Chowdhury | |
| 10,424,451 | B2 * | 9/2019 | Lenig | H01H 9/56 |
| 10,594,138 | B2 * | 3/2020 | Blood | H02J 3/24 |
| 2001/0001534 | A1 | 5/2001 | Lawson | |
| 2002/0128759 | A1 | 9/2002 | Sodoski | |
| 2002/0140433 | A1 | 10/2002 | Lawson | |
| 2003/0085715 | A1 | 5/2003 | Lubkeman | |
| 2004/0245994 | A1 * | 12/2004 | Schlapp | G01R 31/11 324/500 |
| 2005/0033481 | A1 | 2/2005 | Budhraja | |
| 2006/0125486 | A1 | 6/2006 | Premerlani | |
| 2007/0085549 | A1 | 4/2007 | Fischer | |
| 2008/0074810 | A1 | 3/2008 | Guzman-Casillas | |
| 2008/0100146 | A1 * | 5/2008 | Washington | H02J 9/06 307/130 |
| 2009/0039655 | A1 | 2/2009 | Berchowitz | |
| 2009/0160454 | A1 | 6/2009 | Johansson | |
| 2009/0219030 | A1 | 9/2009 | Salem | |
| 2009/0254297 | A1 | 10/2009 | Bengtsson | |
| 2009/0322083 | A1 * | 12/2009 | Wagoner | H02P 9/006 290/44 |
| 2010/0194324 | A1 | 8/2010 | Kasztenny | |
| 2011/0063761 | A1 * | 3/2011 | Kasztenny | H02H 7/045 361/36 |
| 2011/0063767 | A1 * | 3/2011 | Kasztenny | H02H 3/28 361/66 |

(56) References Cited

U.S. PATENT DOCUMENTS

| | | |
|---|---|---|
| 2011/0085272 A1 | 4/2011 | Schweitzer |
| 2011/0158786 A1 | 6/2011 | Molitor |
| 2011/0295530 A1* | 12/2011 | Oowada ............. G01R 31/2829 702/58 |
| 2012/0016531 A1* | 1/2012 | Ganev ...................... H02H 3/00 700/293 |
| 2012/0112758 A1 | 5/2012 | Weems |
| 2013/0300209 A1 | 11/2013 | Long |
| 2013/0342948 A1* | 12/2013 | Jankowski .............. H02H 7/20 361/93.9 |
| 2015/0051852 A1 | 2/2015 | Pan |
| 2015/0222122 A1 | 8/2015 | Nuqui |
| 2016/0025811 A1 | 1/2016 | Kasztenny |
| 2016/0049891 A1 | 2/2016 | Frampton |
| 2016/0181790 A1 | 6/2016 | Thompson |
| 2018/0145582 A1* | 5/2018 | Shuai .................. H02M 7/5387 |
| 2019/0089197 A1* | 3/2019 | Mao ........................ H01F 27/36 |
| 2019/0097417 A1 | 3/2019 | Chowdhury |
| 2019/0097418 A1* | 3/2019 | Chowdhury ........... G01R 31/50 |
| 2019/0137568 A1* | 5/2019 | Freire ...................... F03D 9/25 |
| 2019/0324064 A1* | 10/2019 | Kinsella ............. G01R 19/0092 |
| 2019/0324075 A1* | 10/2019 | Kinsella .................. H01F 38/30 |

FOREIGN PATENT DOCUMENTS

| | | |
|---|---|---|
| JP | 56002569 | 1/1981 |
| JP | 3212117 | 9/1991 |
| JP | 1177646 | 7/1995 |
| JP | 11133093 | 5/1999 |
| JP | 2000333359 | 11/2000 |
| WO | 239642 | 5/2002 |
| WO | 2014067742 | 5/2014 |

OTHER PUBLICATIONS

Beckwith Electric Co., Inc., M-3425A Generator Protection flyer, 2001.

Beckwith Electric Co., Inc., M-3425A Generator Protection Instruction Book, 2004.

Siemens AG, Numerical Machine Protection Manual 7UM515 V3.1, Published 1996.

ABB, Type DGF Generator Field Relay Instruction Leaflet, ABB Inc. Feb. 1977.

J.Lewis Blackburn, Protective Relaying Principles and Applications, Chapter 8: Generator Protection, pp. 262-267, 1997.

Tyco Electronics Energy Division, Installation and Operating Instructions R.O.C.O.F. Protection Relay, Issue 1, Nov. 2002.

Dale Finney and Gerald Johnson, Loss of Prime Mover (Antimotoring) Protection, IEEE Tutorial on the Protection of Synchronous Generators, Special Publication of the IEEE Power System Relaying Committee, Second Ed., Chapter 3, Section 5, 2011.

IEEE, IEEE Guide for AC Generator Protection, IEEE Std C37. 102-1006, pp. 68-70, 2007.

Michael Simpson and John Merrell, Low Zero-Sequence Impedances on Generators, Aug. 30, 2000.

Mu Longhua and Li Xiaobo, Selective Ground-fault Protection Using an Adaptive Algorithm Model in Neutral Ungrounded Power Systems, IEEE International Conference on Power System Technology, Dec. 2000.

Benmouyal, G. "The Impact of Synchronous Generators Excitation Supply on Protection Relays". Schweitzer Engineering Laboratories, Inc. Oct. 29, 2007.

Schweitzer Engineering Laboratories, Inc., SEL-300G Generator Relay flyer, Jun. 22, 2007.

Klingerman, Nathan, et al., "Understanding Generator Stator Ground Faults and Their Protection Schemes", Presented at the 42nd Annual Western Protective Relay Conference, Oct. 2015.

Beckwith Electric Co., Inc., Application Note #27, "Beckwith Electric M-3425A Generator Protection Relay Setting Clarification 27TN Third Harmonic Undervoltage Element", Dec. 13, 2004.

Siemens, Siprotec 5 Generator Protection 7UM85 Manual, Sections 6.7-6.9, Nov. 2015.

\* cited by examiner

SECURITY IMPROVEMENTS FOR ELECTRIC POWER GENERATOR PROTECTION

RELATED APPLICATIONS

This application claims priority under 35 U.S.C. § 119 to U.S. Provisional Patent Application No. 62/926,034 filed on 25 Oct. 2019, titled "Security Improvements for Electric Power Generation Protection," and naming Ritwik Chowdhury, Dale Finney, and Normann Fischer as inventors, which is hereby incorporated by reference in its entirety.

TECHNICAL FIELD

This disclosure relates to methods and devices that may be used to improve security of electric power generator protection. More particularly, the methods and devices herein improve generator protection security by detecting wiring defects in an electric power generator installation. Wiring defects may be detected using generator installation third harmonic voltages.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
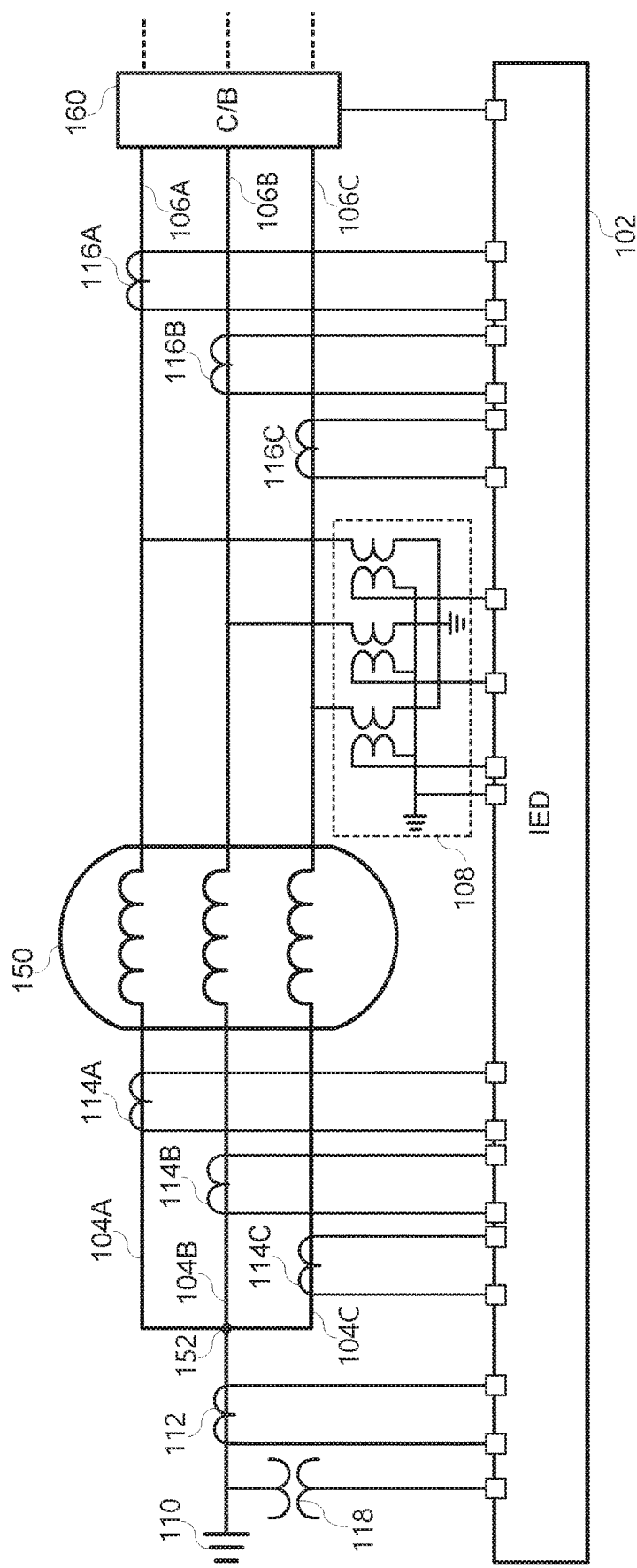
FIG. 1 illustrates a simplified block diagram of an electric power generator and protective device.

Electric power delivery systems include varied equipment used to maintain the reliability of electric power generation, transmission, and distribution. Generators play the important role of generating the electric power that is transmitted, distributed, and consumed using an electric power delivery system. Generators may be embodied in many different forms and may be in electrical connection with the electric power delivery system in different ways, and may even be grounded in different ways. Many generators include a prime mover which rotates a rotor near a stator such that a voltage is induced in the windings of the stator by the rotation of the rotor. Generators may be multi-phase, with many generators in modern electric power delivery systems providing three phases of power.

A protective device, such as an intelligent electronic device (IED) may receive signals from a generator; use those signals to determine whether the generator is operating within predetermined safe operating parameters; and take protective actions such as tripping a circuit breaker when the system is operating outside of those safe operating parameters. Electrical generator signals may be obtained using instrument transformers or other electrical connections with generator electrical points. Instrument transformers may include, for example, current transformers (CTs), potential transformers (PTs), and the like, for obtaining electrical signals related to generator currents and voltages at certain points. The protective device may use the electrical signals to determine a variety of operating conditions of the generator, and compare the determined operating conditions with safe operating parameters.

Electric power generators may include multiple phases, and multiple points of measurement. For example, a generator may be a three-phase generator, providing electric power on three phases at terminals of the stator. Each phase may exhibit a current and a voltage. The stator may include a neutral point between the three phases. The voltage of the neutral connection may be useful to determine operating conditions of the generator. The protective device may obtain these signals by electrical connection with the points of the generator and/or with instrument transformers. Due to the large number of available signals, many connections to the protective device must be accurately made for the protective device to properly determine the operating condition and protective functions to be appropriately applied. If any one connection includes a defect such as miswiring, connecting to an incorrect terminal, electrical contact with ground or another conductor, or the like, the protective device may not operate as intended (e.g. not detect unsafe and abnormal operating conditions, or incorrectly detect unsafe and abnormal operating conditions). Improper protection may result in damage to the generator or other equipment, or the generator improperly being taken off line resulting in reduction or disruption of electric power to the electric power system.

What is needed in generator protection is improvement to generator protection security by simply and reliably detecting wiring defects. Presented herein are improvements to protective devices to determine generator installation wiring defects using available signals. The improvements include a comparison of third-harmonic voltages obtained from the electric power generator to detect wiring defects. If a wiring defect is detected, certain protection elements may be blocked, and an alarm may be issued to facilitate correction of the defect.

Reference throughout this specification to "one embodiment" or "an embodiment" indicates that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and/or a product of a process. The phrases "connected to," "networked," and "in communication with" refer to any form of interaction between two or more entities, including mechanical, electrical, magnetic, and electromagnetic interaction. Two components may be connected to each other, even though they are not in direct physical contact with each other and even though there may be intermediary devices between the two components.

Some of the infrastructure that can be used with embodiments disclosed herein are already available, such as: general-purpose computers, computer programming tools and techniques, digital storage media, and optical networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as: non-volatile memory, static RAM, dynamic RAM, ROM, CD-ROM, disk, tape, magnetic, optical, flash memory, or other computer readable storage medium.

The described features, operations, or characteristics may be combined in any suitable manner in one or more embodiments. It will also be readily understood that the order of the steps or actions of the methods described in connection with the embodiments disclosed herein may be changed, as would be apparent to those skilled in the art. Thus, any order in the drawings or detailed description is for illustrative purposes only and is not meant to imply a required order, unless specified to require an order. In the following description, numerous details are provided to give a thorough understanding of various embodiments. One skilled in the relevant art will recognize, however, that the embodiments disclosed herein can be practiced without one or more of the specific details, or with other methods, components, materials, etc. In other instances, well-known structures, materials, or operations are not shown or described in detail to avoid obscuring aspects of this disclosure.

FIG. 1 illustrates a simplified block diagram of a device 102 for protection of an electrical generator. The electric generator 150 may be used to provide electric power to an electric power delivery system. The delivery system may include a generation, transmission, or distribution system, or a combination thereof. The generator may be any capable of generating electric power for use in an electric power delivery system, such as, for example, a steam turbine driven generator, a gas turbine driven generator, a hydroelectric generator, a diesel generator, or the like.

The generator 150 may include a neutral side with phase terminals 104A, 104B, and 104C in electrical communication with a neutral point 152 in connection with a common reference such as a ground 110. Each of the phase terminals 104A, 104B, and 104C may be associated with a different phase of a three-phase power system. The generator 150 may include a power system side with phase terminals 106A, 106B, and 106C. Each of the phase terminals 106A, 106B, and 106C may be associated with a different phase of the three-phase power system.

The generator 150 may be monitored, controlled, automated, and/or protected using an intelligent electronic device ("IED") such as IED 102. In general, IEDs in an electric power generation and transmission system may be used for protection, control, automation, and/or monitoring of equipment in the system. Generally, IEDs may be used to monitor equipment of many types, including electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment. As used herein, an IED may refer to any device that monitors, controls, automates, and/or protects monitored equipment within system. Such devices may include, for example, remote terminal units, differential relays, distance relays, directional relays, feeder relays, overcurrent relays, voltage regulator controls, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

IED 102 may obtain electrical generator signals using PT 108, neutral voltage connection 118, and CTs 112, 114A, 114B, 114C, 116A, 116B, and 116C. As illustrated CTs 114A, 114B, and 114C are each separately in electrical communication with neutral-side terminals 104A, 104B, and 104C, respectively; and CTs 116A, 116B, and 116C are each separately in electrical communication with power system side terminals 106A, 106B, and 106C, respectively. CTs 114A-C and 116A-C may include windings to provide electrical signals to IED 102 in proportion to the electrical current of the terminals with which they are in electrical communication. PT 108 may similarly provide an output proportional to a voltage at the PT measuring point on the terminal side of the generator 150. Voltage connection 118 may provide an output proportional to a voltage on the neutral. Generators may be installed in many different configurations and different protection may require different electrical signals. For example, the generator may be ungrounded, high-impedance grounded, or grounded through other techniques. Voltages and/or currents may be obtained from various more points. PTs may be connected in delta or wye configuration. The generator may include a transformer between the windings 150 and the circuit breaker 160, and electrical signals from both sides of the transformer may be obtained. As is illustrated, there are many signal connections from instrument transformers of the generator to the IED 102 that must be correctly made for the signals to be useful for generator protection.

In one example of an IED for protection of a generator, there are 48 reasonably possible ways to wire a PT to the IED in a three-phase system. For example, the phase A terminal of the IED may have one of the six system voltages wired (VA, −VA, VB, −VB, VC, or −VC); the phase-B terminal of the IED may have the other four options corresponding to the two phases that are not wired (e.g. VB, −VB, VC, or VC); and the phase-C terminal of the IED may have the other two options (e.g. VC, or −VC). Of the 48 ways, one is correct and 47 are incorrect. For proper protection of the generator using voltage signals, it is important for the wiring to be correct.

In addition to receiving various voltage signals, IED 102 may be configured to also receive current signals from the neutral side of the generator and from the power system side of the generator using its electrical connections with CTs 114A-C and 116A-C. IED 102 may be configured as further described herein to provide various protection elements to the generator, and associated zone including, for example, differential protection (phase and ground), stator ground, overvoltage, overfrequency, underfrequency, earth fault, turn fault, loss of field, out-of-step, synchronism checks, and the like.

The illustrated system further includes a circuit breaker 160 in electrical communication with the power system side phase terminals. Circuit breaker 160 may be placed between the generator 150 and an interconnection with an electric power delivery system. IED 102 may be in electrical communication with circuit breaker 160 to obtain status information (open/closed) therefrom and to send commands thereto such as a trip command for circuit breaker 160 to open. The IED 102 may be configured to issue further commands or communications to isolate the generator 150 and notify the appropriate personnel or systems. For example, commands or communications from IED 102 may be used to open circuit breakers, close valves such that a prime mover of the generator is isolated from rotational forces and/or notify personnel using network communications, a human-machine interface, or the like.

Figure 2:
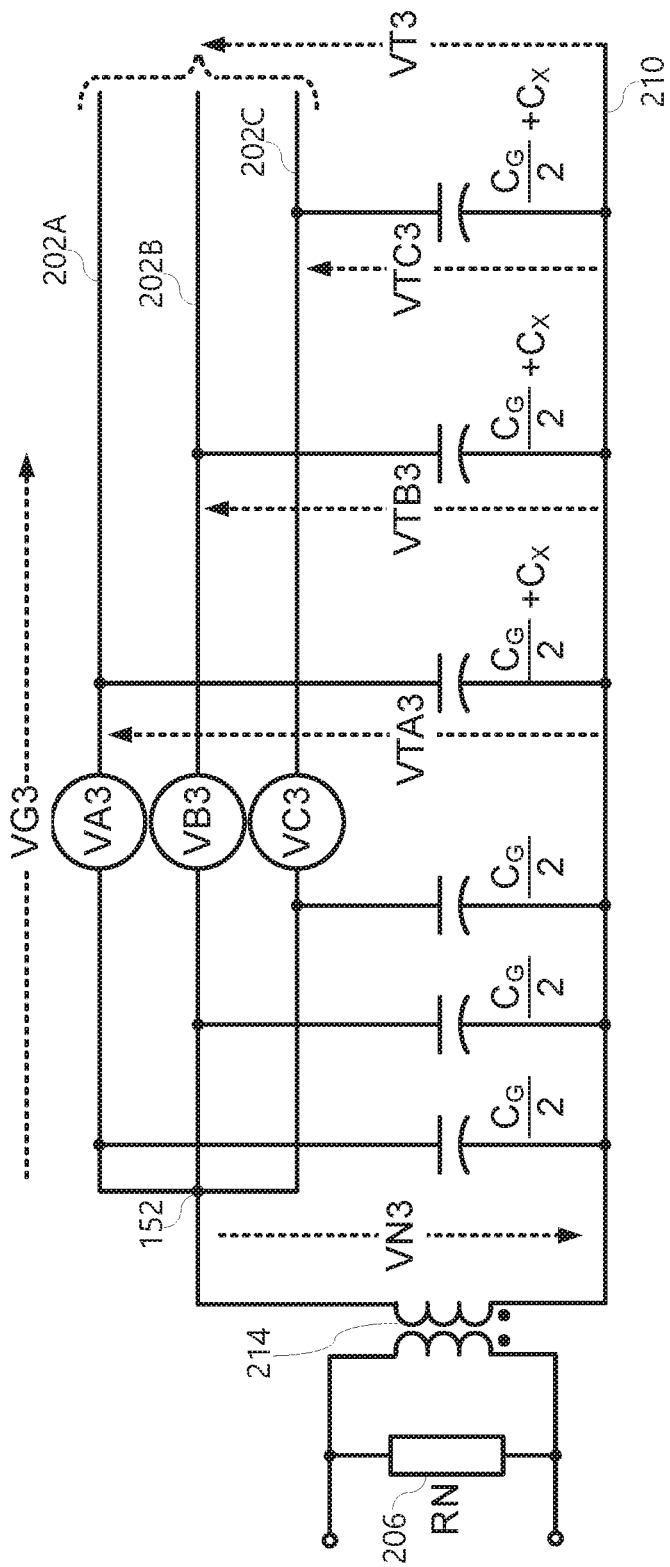
FIG. 2 illustrates a representative simplified circuit diagram of terminal and neutral voltages of an electric power generator.

FIG. 2 illustrates a simplified diagram of a resistance-capacitance network of a high-resistance grounded generator 150. The three electrical phases of the stator 202A, 202B, and 202C are in electrical connection at a neutral point 152, which is in connection with ground 210 via a neutral grounding transformer 214. The neutral voltage (including the third harmonic voltage at the neutral VN3) may be measured using terminals across a neutral resistor 206. Third harmonics of the phase voltages at the terminals (VTA3, VTB3, VTC3) may be measured using signals from a PT such as is illustrated in FIG. 1. Generator terminal third harmonic voltage at the terminal VT3 may be calculated as an average of the third harmonic phase voltages VTA3, VTB3, VTC3. Capacitances to ground for each phase is illustrated, where $C_G$ indicates a generator insulation capacitance, and $C_X$ indicates an external capacitance originating from the iso-phase bus, generator step-up unit ("GSU"), or the like.

Figure 3:
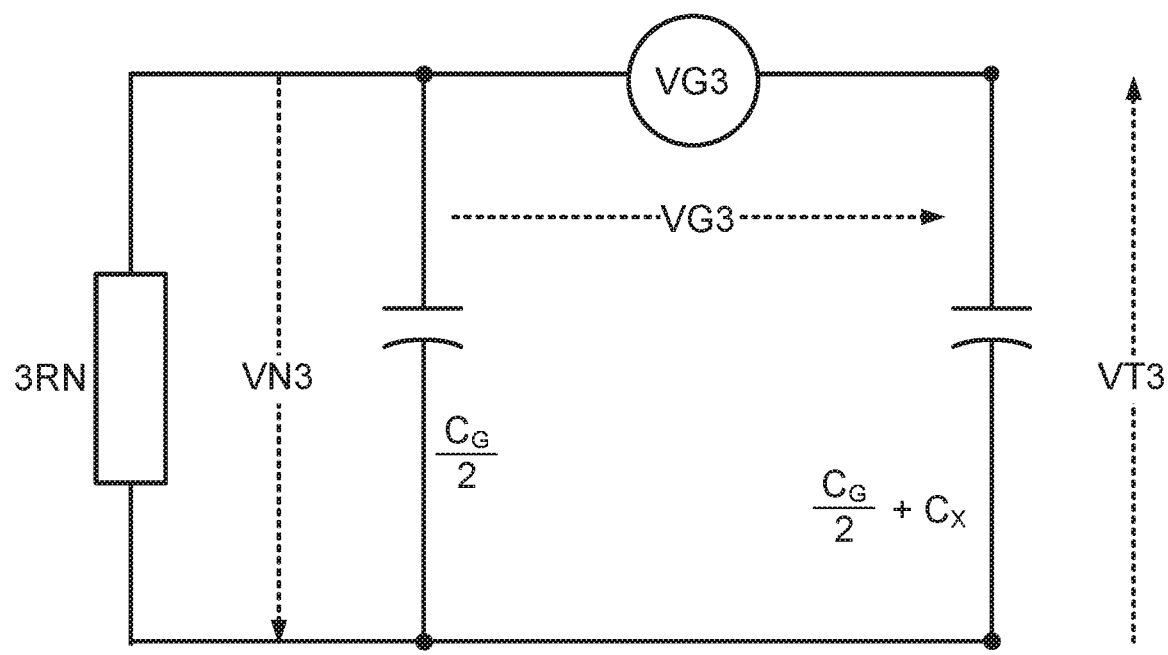
FIG. 3 illustrates a representative simplified circuit diagram of third harmonic components of an electric power generator.

FIG. 3 illustrates a simplified single-phase third-harmonic (or zero-sequence) circuit for a generator such as generator 150. It may be observed that the angle of VT3 to VN3∠ (VT3/VN3) will be between −90° and 0° under nominal or faulted operating conditions. This observation may be used to detect a wiring defect at the generator neutral and/or terminal. Generally, the resistance RN may be sized according to the capacitance in the system at nominal frequency. At higher frequencies such as the third harmonic, the susceptance corresponding to the capacitances is higher. Generally, the angle of VT3 to VN3 at the third harmonic will be in the range of around −30°. The angle may depend on the particular installation and configuration of the generator. For example, if the generator has an LV breaker which is open (that is, making $C_X$=0), the angle may be lower than −30° but higher than −90°.

Figure 4A:
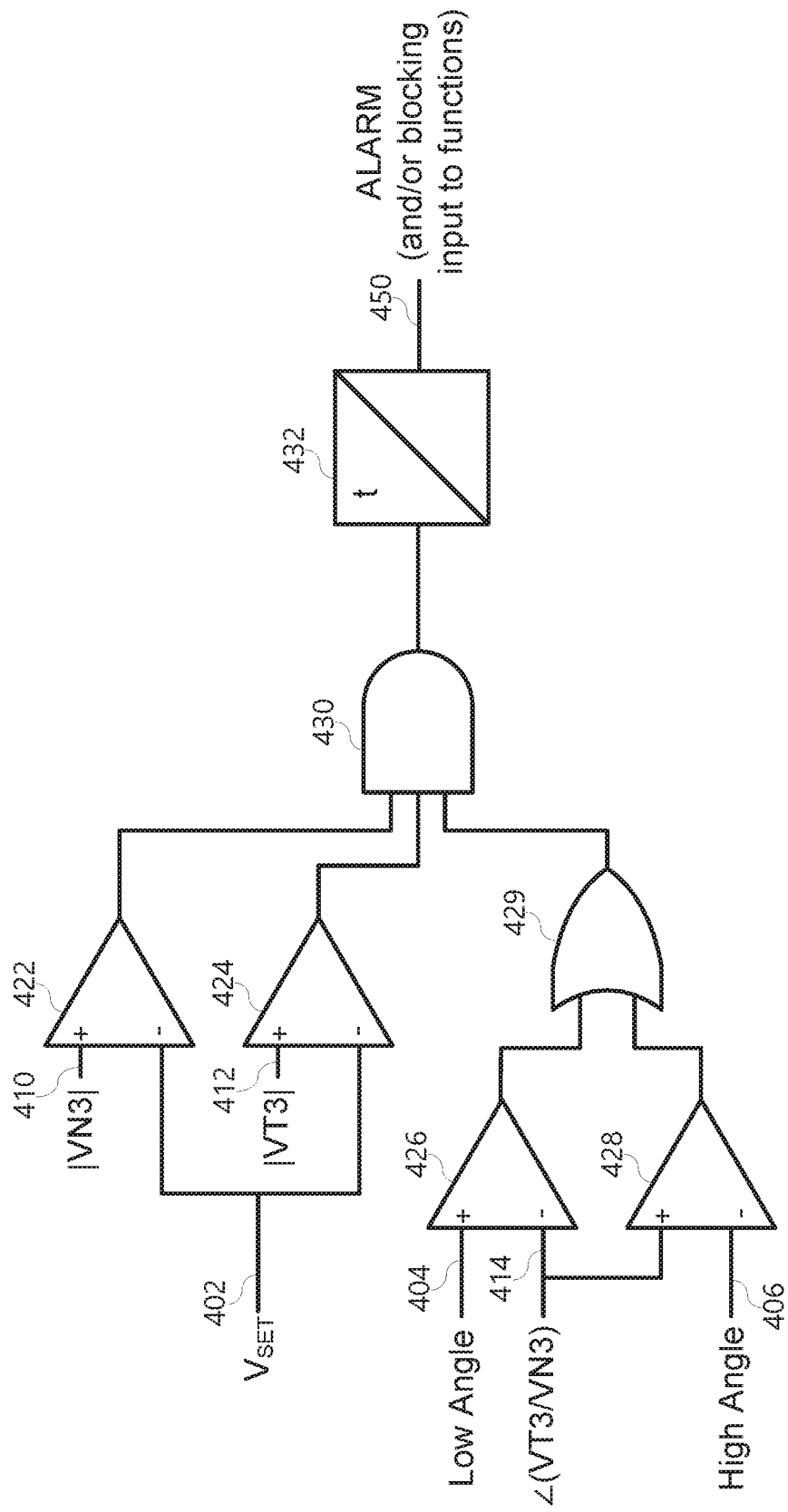
FIG. 4A illustrates one embodiment of logic useful for detecting wiring defects to improve security of electric power generator protection.

FIG. 4A illustrates a simplified logic diagram useful for determining wiring defects to increase security for protection of an electric power generator in accordance with several embodiments herein. The third harmonic voltage at the neutral VN3 and the third harmonic voltage at the terminal VT3 obtained from electrical signals from the generator as illustrated in FIG. 1 may be obtained and used to determine a wiring defect. Settings, such as a voltage calibration setting $V_{SET}$ 402 may be entered by a user, or may be calculated based on a setting entered by a user. For example, $V_{SET}$ may be calculated as a fraction of a nominal voltage, such as 0.25% of the setting of a nominal line-to-ground voltage $V_{LG}$. The low angle setting 404 and the high angle setting 406 may be based on the configuration of the generator as described above. In accordance with several embodiments, the low angle setting 404 may be around −135° and the high angle setting may be around 45°. When the generator installation would result in an angle between VT3 and VN3 as between around −90° and 0°, the low and high angle settings 404, 406 may be below −90° and above 0°, respectively. The low and high angle settings 404, 406 may allow for a buffer between the expected angle between VT3 and VN3. As briefly illustrated above, the expected angle between VT3 and VN3 may be between −90° and −30° in one particular configuration; and the low and high settings 404, 406 may account for those expected angles as −135° and 45°, respectively.

In accordance with the illustrated logic, the magnitudes of VN3 and VT3 are verified to determine that they are sufficiently high to be useful. As illustrated, the magnitude of VN3 410 is compared 422 with $V_{SET}$ 402; and the magnitude of VT3 412 is compared 424 with $V_{SET}$ 402. If the magnitude of VN3 410 exceeds $V_{SET}$ 402, then comparator 422 asserts; and if the magnitude of VT3 412 exceeds $V_{SET}$ 402, then comparator 424 asserts.

Comparators 426 and 428 may be used to determine whether the angle of VT3/VN3 414 is outside of an acceptable range between the low angle 404 and high angle 406 settings. If the angle of VT3/VN3 414 is below the low angle setting 404, then comparator 426 asserts; and if the angle of VT3/VN3 414 is above the high angle setting 406, then comparator 428 asserts. If either comparator 426 or 428 asserts, the OR gate 429 asserts. It should be noted that the angle of VT3/VN3 is between −180° and 180°. If the magnitudes are above the threshold $V_{SET}$ 402 (assertion of comparators 422, 424) and the angle of VT3/VN3 is below the low angle 404 or above the high angle 406 settings (assertion of comparators 426, 428), then OR gate 429 asserts, then AND gate 430 asserts to timer 432 indicating that a wiring defect may be present. In order to avoid false positive detections of wiring defects, timer 432 may require that AND gate 430 remain asserted for a predetermined time t (which may be on the order of around 0.5 seconds) before asserting an alarm signal 450. The alarm signal may be used to block certain functions of the IED and/or to indicate to a user that a wiring defect may be present on the generator installation. A user may then be alerted to the wiring defect, and take steps to remedy the defect.

It should be noted that the illustrated logic of FIG. 4A is descriptive of one embodiment of the present disclosure, and may be modified. For example, in certain embodiments, inputs 402, 410 and 412 and comparators 422 and 424 are not needed as a voltage check is not performed in order to determine a wiring defect by comparing the angle of VT3/VN3 against predetermined thresholds.

Figure 4B:
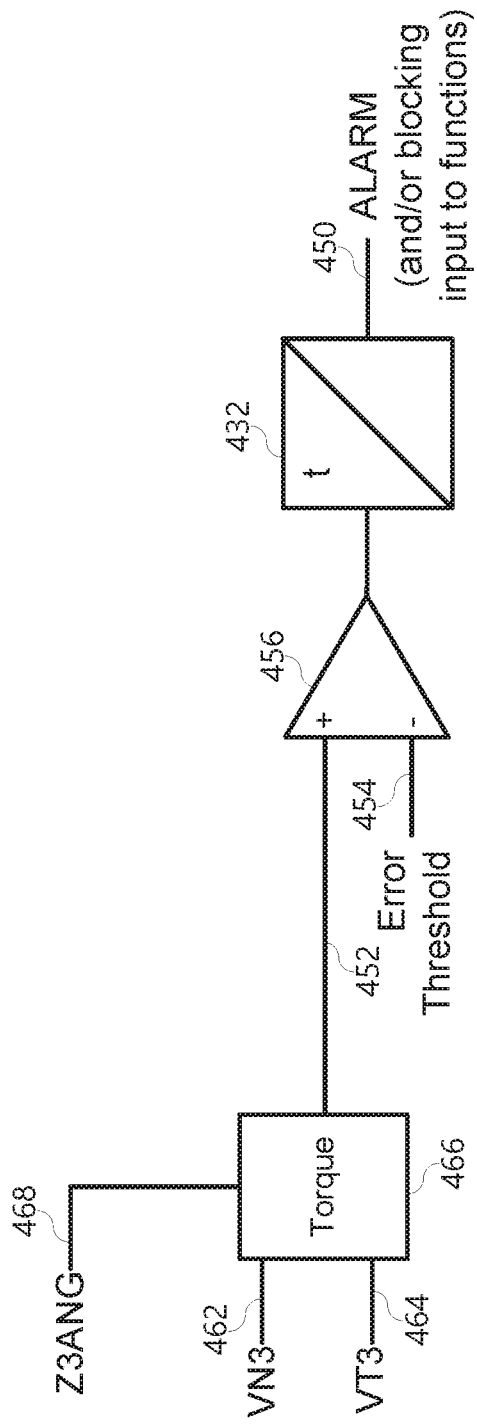
FIG. 4B illustrates one embodiment of logic useful for detecting wiring defects to improve security of electric power generator protection.

FIG. 4B illustrates a simplified logic diagram useful for determining wiring defects to increase security for protection of an electric power generator in accordance with several embodiments herein. As illustrated in FIG. 4A, the logic uses third-harmonic voltages to determine the wiring defect. In particular, the logic compares a function of the third-harmonic voltage at the neutral VN3 462 and the third-harmonic voltage at the terminal VT3 against a threshold to determine wither a wiring defect is present, and issues a block and/or alarm 450. The wiring defect may be determined by calculating a torque from the VN3 462, VT3 464 signals and a user setting of Z3ANG in a torque calculator 466. Torque may be calculated using Equation 1:

$$\text{Torque}=\text{VT3} \cdot \text{conj}(\text{VN3}) \cdot e^{j(Z3ANG+180°)} \qquad \text{Eq. 1}$$

Setting Z3ANG 468 may be related to a third harmonic impedance angle, and may be around 45°. The torque is compared to a predetermined error threshold 454 in comparator 456. If the torque exceeds the error threshold 454, then comparator 456 asserts. The error threshold 454 may be around 0.25. That is, if the magnitude of VT3 is 0.5 Vsec and VN3 is 0.5 Vsec, with perfect angles, the element would detect the wiring defect using the logic in FIG. 4B.

The methods described herein may be used to increase security for several generator protection elements. Security may be improved due to detection of the wiring defect. In particular, security of a third harmonic stator ground detection element may be improved using the wiring detection as described herein. A stator ground fault may be detected when the magnitude of the ratio of VN3 to VG3 is less than a threshold (such as around 15%). It should be noted that VG3 is calculated by a phasor summation of VN3 and VT3. Accordingly, a wiring defect in the equipment providing neutral and/or terminal voltages is likely to result in misoperation of the third harmonic stator ground detection element. Thus, in accordance with several embodiments herein, an alarm or blocking signal that indicates a wiring defect may be used to block operation of the third harmonic stator ground detection element to improve security of the protection element.

The methods described herein may be used to improve security of a synchronism check function of a protective device. A synchronism check may be used to verify that the generator is aligned in voltage magnitude, phase and frequency with the electric power system before connecting the generator to the power system. Voltages on the generator side and the power system side of a circuit breaker or connection switch may be monitored. Closing of circuit breaker or switch may be prevented unless the angle differences between the voltages of each phase on either side of the circuit breaker or switch are all within a predetermined angle difference threshold. Clearly, a wiring defect in any equipment providing voltage signals on either side of the switch may result in faulty angle calculations and misoperation of the synchronism check. As stated above, there are many ways to wire a terminal PT incorrectly, and one way to wire it correctly. The methods described herein may be used to detect wiring defects to improve security of the synchronism check. Thus, in accordance with several embodiments herein, an alarm or blocking signal that indicates a wiring defect may be used to block operation of the synchronism check, improving security of the protection element.

Figure 5:
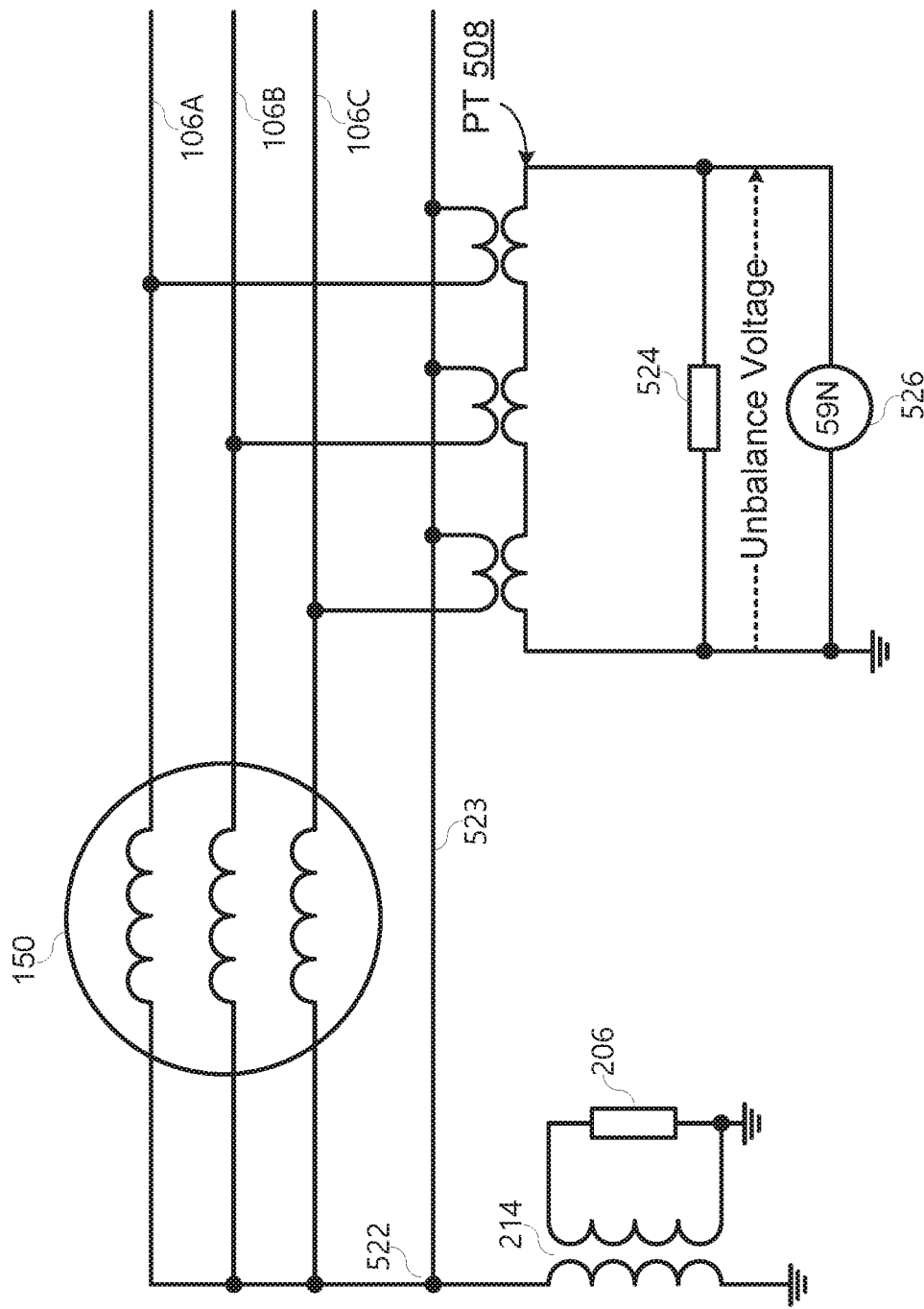
FIG. 5 illustrates a simplified one-line diagram of an electric power generator and protective element of a protective device in accordance with several embodiments described herein.

FIG. 5 illustrates a simplified one-line diagram of one particular generator installation that may benefit from the increased protection security as described herein. In some particular generator protection schemes, stator inter-turn fault detection uses a zero-sequence voltage measurement from the terminals 106A, 106B, 106C to neutral 522. This zero-sequence voltage may be measured using PT 508. This scheme may fail to detect a stator inter-turn fault when the neutral cable 523 has a contact with ground which may result in bypassing the generator high-impedance grounding system hence solidly grounding the generator. To overcome this, in some instances a calculated zero-sequence voltage may be used instead of the measured zero-sequence. The calculated zero-sequence voltage may be determined using a zero-sequence voltage (from the terminal with respect to ground) and the neutral voltage. However, a wiring defect in the voltage measurements providing the terminal zero-sequence voltage signals or the neutral voltage signals may cause the inter-fault detection element to misoperate. For example, a reversed polarity of the neutral voltage wiring may result in a reversed polarity of the neutral voltage signal. The third-harmonic voltages at the terminal and at the neutral may be used as described herein to detect the wiring defect to avoid misoperation. Accordingly, the embodiments herein increase security of the inter-turn fault protection elements.

Figure 6:
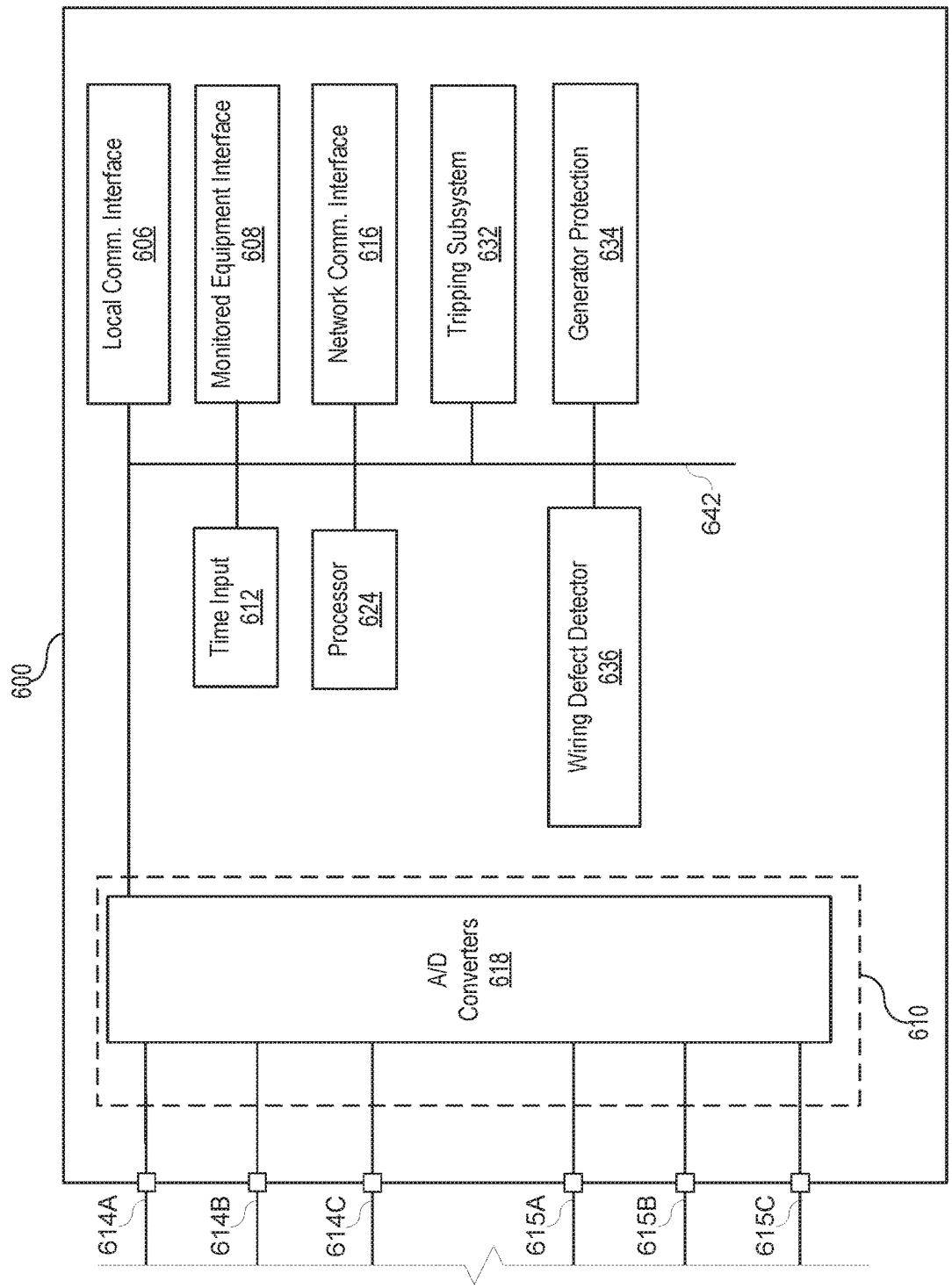
FIG. 6 illustrates a functional block diagram of a generator protection element, in accordance with embodiments of the present disclosure.

FIG. 6 illustrates a functional block diagram of an IED 600 for protection of an electrical generator, including determination of a wiring defect in accordance with several embodiments. IED 600 may be configured to perform a variety of tasks using a configurable combination of hardware, software, firmware, and/or any combination thereof. FIG. 6 illustrates an embodiment that includes hardware and software, various embodiments of the present disclosure may be implemented in an embedded system, field programmable gate array implementations, and specifically designed integrated circuit. In some embodiments, functions described in connection with various software modules may be implemented in various types of hardware. Moreover, certain components or functions described herein may be associated with other devices or performed by other devices. The specifically illustrated configuration is merely representative of one embodiment consistent with the present disclosure.

IED 600 includes a network communications interface 616 configured to communicate with other IEDs and/or system devices. In certain embodiments, the network communications interface 616 may facilitate direct communication with another IED or communicate with another IED over a communications network. The network communications interface 616 may facilitate communications with multiple IEDs. IED 600 may further include a time input 612, which may be used to receive a time signal allowing IED 600 to apply a time-stamp to the acquired samples. In certain embodiments, a common time reference may be received via communications interface 616, and accordingly, a separate time input may not be required for time-stamping and/or synchronization operations. One such embodiment may employ the IEEE 1588 protocol. A monitored equipment interface 608 may be configured to receive status information from, and issue control instructions to, a piece of monitored equipment. In some embodiments, the monitored equipment may be a generator, and IED 600 may be configured to control the operation of the generator.

A local communication interface 606 may also be provided for local communication with IED 600. The local communication interface 606 may be embodied in a variety of ways, including as a serial port, a parallel port, a Universal Serial Bus (USB) port, an IEEE 1394 Port, and the like.

In certain embodiments, IED 600 may include a sensor component 610 (e.g., sensor circuitry) for obtaining electrical signals from the protected equipment. In the illustrated embodiment, sensor component 610 is configured to gather data directly from a plurality of leads from instrument transformers 614A, 614B, 614C, 615A, 615B, and 615C and may use, for example, A/D converters 618 that may sample and/or digitize filtered waveforms to form corresponding digitized current and voltage signals provided to data bus 642. Additional filters and/or transformers may be used in the sensor component 610. A/D converters 618 may include a single A/D converter or separate A/D converters for each incoming signal. A current signal may include separate current signals from each phase of a three-phase electric power system. A/D converters 618 may be connected to processor 624 by way of data bus 642, through which representations of electrical parameters determined by sensor elements may be transmitted to processor 624.

In accordance with other embodiments, the IED may not include a sensor component 610, and receive digitized analog signals of the electric power system signals provided by a separate device such as a merging unit. In certain embodiments, some signals received may be digitized analog signals, and others may be electrical signals provided to a sensor component. In any embodiment, the signals are provided to the processor 624 for use in the various monitoring, protection, and automation functions of the IED 600.

Processor 624 may be configured to process communications received via communications interface 616, time input 612, monitored equipment interface 608, local communications interface 606, and/or sensor component 610 (or digitized analogs provided using a separate sampling device). Processor 624 may operate using any number of processing rates and architectures. Processor 624 may be configured to perform various algorithms and calculations described herein. Processor 624 may be embodied as a general-purpose integrated circuit, an application specific integrated circuit, a field-programmable gate array, and/or any other suitable programmable logic device. In some embodiments, the processor 624 may be generally referred to as processing circuitry.

A generator protection element 634 may include computer instructions stored on non-tangible computer-readable storage media that, when executed by the processor 624, cause the IED to perform certain protection elements. The protection elements may be any as described above, useful to determine an operating condition of the generator and/or electric power delivery system and take a protective action when the operating condition is outside of certain operating parameters. As mentioned above, the determination of the operating condition assumes correct wiring of instrument transformers and other equipment to the IED 600.

In order to avoid misoperation of the generator protection 634 due to wiring defects, the IED may include a wiring defect detector 636. The wiring defect detector may include computer instructions executable by the processor 624 that cause the IED to detect a wiring defect. The instructions 636 may cause the IED 600 to compare an angle of VT3/VN3 to a predetermined low and high angle. When the angle is outside of a range between the predetermined low and high angle, the instructions may issue an alarm and/or block certain protection elements from operating. The instructions may include security measures such that a wiring defect is not erroneously declared. The security measures may include a determination that the magnitudes of VN3 and/or VT3 exceed predetermined minimum threshold(s). The security measures may include a security timer. The instructions may cause the processor to execute the logic illustrated in FIGS. 4A and/or 4B.

A tripping subsystem 632 may be configured to issue a trip command based upon satisfaction of the tripping characteristic. In various embodiments, the tripping subsystem 632 may be in communication with a breaker, recloser, or other device that may be configured to interrupt an electrical connection between the generator and an electric power generation and transmission system.

The above description provides numerous specific details for a thorough understanding of the embodiments described herein. However, those of skill in the art will recognize that one or more of the specific details may be omitted, or other methods, components, or materials may be used. In some cases, operations are not shown or described in detail. While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A system for secure generator protection, comprising:
   an electric power generator configured to generate electrical energy for an electric power delivery system;
   an intelligent electronic device (IED), comprising:
      a voltage signal input to receive voltage signals from a terminal of the electric power generator and a neutral of a stator of the electric power generator;
      a wiring defect detector to determine wiring defects in equipment providing the voltage signals by comparing a function of third harmonic voltage at the terminal and third harmonic voltage at the neutral to a predetermined threshold and assert a wiring defect signal upon detection of the wiring defect; and
      a generator protection element to determine an operating condition of the electric power generator and assert a protective operation;
      wherein the IED blocks the protective operation upon assertion of the wiring defect signal.

2. The system of claim 1, wherein the generator protection element comprises a stator ground protection fault detection.

3. The system of claim 1, wherein the generator protection element comprises a synchronism check.

4. The system of claim 1, wherein the generator protection element comprises a stator inter-turn fault detection.

5. The system of claim 1, wherein the function of third harmonic voltage at the terminal and third harmonic voltage at the neutral comprises an angle of the third harmonic voltage at the terminal to the third harmonic voltage at the neutral.

6. The system of claim 5, wherein the predetermined threshold comprises a range of angles.

7. The system of claim 6, wherein the wiring defect detector is configured to assert the wiring defect signal when the angle is outside of the range of angles.

8. The system of claim 7, wherein the range of angles comprise −135° to 45°.

9. The system of claim 1, wherein the function of third harmonic voltage at the terminal and third harmonic voltage at the neutral comprise a torque.

10. The system of claim 9, wherein the torque is calculated as:

$$\text{Torque} = VT3 \cdot \text{conj}(VN3) \cdot e^{j(Z3ANG + 180°)}$$

where:
   VT3 comprises the third harmonic voltage at the terminal;
   VN3 comprises the third harmonic voltage at the neutral; and
   Z3ANG comprises a constant.

11. The system of claim 9, wherein the wiring defect detector is configured to assert the wiring defect signal when the torque exceeds the predetermined threshold.

12. A method for secure generator protection, comprising:
   obtaining terminal voltage signals from equipment in communication with phase terminals of an electric power generator;
   obtaining neutral voltage signals from equipment in communication with a neutral of the electric power generator;
   calculating a third harmonic voltage at the terminal using the terminal voltage signals;
   calculating a third harmonic voltage at the neutral using the neutral voltage signals;
   calculating a function of the third harmonic voltage at the terminal and the third harmonic voltage at the neutral;
   comparing the function with a predetermined threshold;
   when the function exceeds the predetermined threshold, asserting a wiring defect signal;

blocking a protective operation upon assertion of the wiring defect signal.

13. The method of claim 12, wherein the equipment in communication with the phase terminals and the equipment in communication with the neutral comprise wiring.

14. The method of claim 12, wherein the protective operation comprises a stator ground fault detection.

15. The method of claim 12, wherein the protective operation comprises a synchronism check.

16. The method of claim 12, wherein the protective operation comprises stator inter-turn fault detection.

17. The method of claim 12, wherein the function of third harmonic voltage at the terminal and third harmonic voltage at the neutral comprises an angle of the third harmonic voltage at the terminal to the third harmonic voltage at the neutral.

18. The method of claim 17, wherein the predetermined threshold comprises a range of angles.

19. The method of claim 17, wherein the wiring defect detector is configured to assert the wiring defect signal when the angle is outside of the range of angles.

20. The method of claim 12, wherein the function of third harmonic voltage at the terminal and third harmonic voltage at the neutral comprise a torque.

\* \* \* \* \*